(12) United States Patent
Rhodes (10) Patent No.: US 8,250,097 B2
(45) Date of Patent: Aug. 21, 2012

(54) ONLINE IDENTITY MANAGEMENT AND IDENTITY VERIFICATION

(76) Inventor: Hue Rhodes, New York, NY (US)

( * ) Notice: Subject to any disclaimer, the term of this patent is extended or adjusted under 35 U.S.C. 154(b) by 294 days.

(21) Appl. No.: 12/263,601

(22) Filed: Nov. 3, 2008

(65) Prior Publication Data
US 2009/0119299 A1    May 7, 2009

Related U.S. Application Data

(60) Provisional application No. 60/985,179, filed on Nov. 2, 2007.

(51) Int. Cl.
*G06F 17/30* (2006.01)
(52) U.S. Cl. ........................................ 707/783
(58) Field of Classification Search ........... 707/2, 104.1, 707/783; 709/223
See application file for complete search history.

(56) References Cited

U.S. PATENT DOCUMENTS

| | | | |
|---|---|---|---|
| 6,266,525 B1 * | 7/2001 | Peterson | 455/410 |
| 6,466,917 B1 * | 10/2002 | Goyal et al. | 705/18 |
| 7,131,003 B2 | 10/2006 | Lord et al. | |
| 7,275,215 B2 | 9/2007 | Werndorfer et al. | |
| 2002/0029194 A1 * | 3/2002 | Lewis et al. | 705/39 |
| 2002/0073339 A1 * | 6/2002 | Card | 713/201 |
| 2002/0083008 A1 | 6/2002 | Smith et al. | |
| 2003/0065558 A1 | 4/2003 | Shaw et al. | |
| 2003/0163811 A1 * | 8/2003 | Luehrs | 725/25 |
| 2003/0229783 A1 | 12/2003 | Hardt | |
| 2006/0047725 A1 * | 3/2006 | Bramson | 707/204 |
| 2006/0277287 A1 * | 12/2006 | McCall et al. | 709/223 |
| 2007/0094264 A1 | 4/2007 | Nair | |
| 2007/0143860 A1 | 6/2007 | Hardt | |
| 2007/0276795 A1 * | 11/2007 | Poulsen | 707/2 |
| 2007/0288360 A1 * | 12/2007 | Seeklus | 705/38 |
| 2008/0109894 A1 * | 5/2008 | Smithson | 726/18 |

* cited by examiner

*Primary Examiner* — Etienne Leroux
(74) *Attorney, Agent, or Firm* — Jeffrey D. Myers; Justin R. Jackson; Peacock Myers, P.C.

(57) ABSTRACT

A user identity verification apparatus and method comprising, via one or more processors, collecting in a computer database consolidated user data comprising information about a method user from a plurality of sources comprising credit bureau information, information from data vendors, and public information, generating a profile of the method user comprising a plurality of subsets of the consolidated user data corresponding to a plurality of access levels, receiving a validation request from a third party source at an unknown user's request; assigning an access level to the validation request; requesting information from the unknown user, matching returned information from the unknown user to that in the subset of the consolidated user data corresponding to the assigned access level, and verifying to the third party source that the unknown user is the method user.

25 Claims, 8 Drawing Sheets

ONLINE IDENTITY MANAGEMENT AND IDENTITY VERIFICATION

CROSS-REFERENCE TO RELATED APPLICATIONS

This application claims priority to and the benefit of the filing of U.S. Provisional Patent Application Ser. No. 60/985,179, entitled "Software for Securely Consolidating, Managing, Enriching and Distributing Personal Data and Content", filed on Nov. 2, 2007, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods, software, and apparatuses for online identity management and identity verification.

2. Description of Related Art

With the plethora of user registrations that the typical World Wide Web ("Web") user creates, it becomes nearly unmanageable to maintain consistent information between them, and to provide concomitant appropriate levels of information to the various Web sites for which registrations exist. No satisfactory solution for this problem is currently available that also provides ongoing identity validation and management and/or that provides users with security independent of the host system. The present invention solves this and other problems with the current chaotic state of affairs.

BRIEF SUMMARY OF THE INVENTION

The present invention is of a user identity verification apparatus and method comprising, via one or more processors: collecting in a computer database consolidated user data comprising information about a method user from a plurality of sources comprising credit bureau information, information from data vendors, and public information; generating a profile of the method user comprising a plurality of subsets of the consolidated user data corresponding to a plurality of access levels; receiving a validation request from a third party source at an unknown user's request; assigning an access level to the validation request; requesting information from the unknown user; matching returned information from the unknown user to that in the subset of the consolidated user data corresponding to the assigned access level; and verifying to the third party source that the unknown user is the method user. In the preferred embodiment, the requested information comprises information from a credit bureau. Altering the profile of the method user is done as information from the plurality of sources changes over time, preferably the prompting the method user to enter matching changed information in order to maintain a validated status. The invention allows the method user to alter the profile, followed by verifying with the plurality of sources that the alteration to the profile is accurate. The method can be used by an unknown user seeking authorization by the third party via a two-factor authentication process. The invention can mark a profile as that of a parent or a child, wherein the profiles can be linked such that parents have control over the profiles of the children. A contact manager can be established for the method user containing information on other users and an indication of whether such other users have been verified by the method.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a method, software, and apparatus for managing online identify information. The invention comprises one or more of the following components:

1. Identity Verification Engine (IVE). A back-end system that provides identity verification for internet sites. System allows sites to segregate their users into multiple validation levels, like government security clearance levels. Each level preferably requires more information from credit and other records. Example levels are: light, basic, secure, child-safe, and credit-worthy. The invention preferably also provides iconography to establish cross-site validation branding.

2. Personal Identity Manager (PIM). A website that allows consumers to generate their own validated internet profiles, preferably using the same security levels and iconography as the Identity Verification Engine. Users can post these icons on sites who have not licensed the IVE through pre-developed widgets, HTML embeds, and links.

3a. Web-based 2-factor authentication. A website that verifies individual identity through rigorous out-of-wallet questions, and then pares that verification with a corporation's username/password verification. The result is 2-factor (something you know plus something you are) verification, which can be used for remote intranet login, private spaces in public sites and virtual networks.

3b. Parent 2.0. This component links identity verification to social networks for minors. The Personal Identity Manager expands to include identities for children, and maps of their social networks. Parents can restrict children to only making "friends" with children who have verified parents. The invention then preferably provides contact information for other parents. The invention then alerts parents of all social ties that their children establish. The invention can also provide call center escalation for concerned parents (regarding, e.g., internet bullying, suspicious profiles, inappropriate content, etc.).

4. Internet Identity Manager. This component provides a single interface for managing all social network identities, including global friends list, aggregate media bins, cross-site blog publishing, and drag-and-drop network populating. This preferably requires a critical mass of social networks to adopt an open standard and allow for remote login and third party network manipulation. An individual could select various aspects of his identity (address, contact info, credit worthiness) to publish on different networks and sites. The invention can extend beyond social networks to serve as an identity "wallet" for partner sites.

5. Next Generation Credit Score. This component provides for merging of interpersonal network data with credit data (which comes with verification). Whereas credit scores are history-based, and re-active, network association data allows prediction of loan risk, even in the absence of transactional history. Social network analysis also allows for the creation of new "archetypes" which will add dimensions to credit risk, individual's popularity, and like analyses.

The capabilities of the invention include the abilities to:

1. Provide users who are virtually connected to other users' confidence that those other users are who they purport to be.

2. Monitor user profile changes within a system to flag potential identity fraud.

3. Monitor external changes to private data to flag internal-external discrepancies.

4. Give networked communities the ability to define identity in terms of the specific context for which the communities exist (dating, business, trade, employment) and monitor those identities in that context.

5. Give users the ability to verify their own identities in virtual environments where no uniform method of verification exists.

6. Allow minors to take advantage of virtual communities safely.

7. Give parents tools to protect their children online from bullies, predators and sexual offenders.

8. Expand the networking tools available to businesses by providing two-factor authentication for public, un-secure environments.

9. Give user users the ability to manage all their authenticated contacts in one interface, regardless of the origin of those contacts.

10. Predict future changes of user identity components by analyzing the user's larger network over time for relevant patterns and indicators.

11. Let users disclose varying degrees of their private information (social, geographic, financial) depending their priorities.

12. Decrease identity fraud and increase user confidence by reducing the fear of identity theft and online security.

13. Give users a level of identity security independent of the identity protection measures of a particular system that requires private information.

14. Increase participation in networked systems by certifying the identities of all participants in the system.

15. Implement an "immunization" model of virtual communities, where every user is certified as authentic and valid, rather than the current "sterilization" model of virtual communities, where the burden is on the system to be secure and imposter-free.

For purposes of the specification and claims, the following terms are defined:

Child—a minor user on a system who has verified parents on that same system.

Contact Manager—The contact manager of the invention gives individual users visibility and screening control over all their contacts via the profile manager and the identity engine. The contact manager also provides communication tools, messaging, blocking and visibility controls, extending the functionality of the systems for which the profiles exist. The contact manager is further illustrated in FIG. 8.

Data Sources—Vendors, databases, public records, and other repositories of user information.

Identity—the compellation of data elements that serves to represent a user totally and uniquely, in a particular context. Those data elements include, but are not limited to, physical address, age, social security number, hospital records, employment records, credit scores, financial history, rental history, educational history and criminal records.

Identity Engine—The identity engine of the invention uses information from data sources, as well as information collected within the invention, combined with its own analysis, to create data identities for all users, and to monitor changes to those data identities. The identity engine is further illustrated in FIG. 1.

Identity Fraud—when a user presents the data from another user's "identity" to either specifically pose as that other user, or obfuscate his or her own identity.

Minor—a user under 18. Minors cannot have profiles verified by the invention unless they have a parent that is also verified on the system.

Parent—the legal guardian of a minor in question.

Profile—the subset of identity data presented in a virtual context as a proxy for identity. Most virtual profiles require some identity information (name, address, birthday, etc.) and others offer the option of disclosing more (credit ranking, income levels, employment history, etc.) In addition, virtual profiles are not always required to be completely or partially accurate. The extent to which a profile should be monitored for fraud depends on the authenticity requirements in that system.

Profile Manager—The profile manager of the invention tracks all the profiles a user creates, as well as the specific pieces of private information comprising those profiles. The profile manager also creates a master profile that links all the user profiles together. The master profile is used to connect with the identity engine, therefore resolving the many-to-one relationship of profiles to user. The profile manager is further illustrated in FIG. 1.

System—anything that requires a user to uniquely identify him-her-or-itself with some distinguishing piece of information. It could be a phone system (cell phone number,) a website (username-password), an intranet, gaming application, etc. The system is a virtual context for users to connect and communicate with each other, or to interact with some larger central entity (a bank, a corporation, etc.)

Two-factor Authentication—a system wherein two different factors are used in conjunction to authenticate a user. An authentication factor is a piece of information or process used to authenticate or verify a person's identity or other entity requesting access under security constraints. Human authentication factors are generally classified into three cases:

1. Something the user has (e.g., ID card, security token, software token, phone, or cell phone);
2. Something the user knows (e.g., a password, pass phrase, or personal identification number (PIN)); and
3. Something the user is or does (e.g., fingerprint or retinal pattern, DNA sequence (there are assorted definitions of what is sufficient), signature or voice recognition, unique bio-electric signals, or another biometric identifier).

The invention creates a new type of factor #3—something the user is—by compiling a unique set of identity data and using that data to facilitate user profile validation.

User—the physical user or entity. When users interact with systems, they do so by their profiles. But these users or entities also take action outside the systems—i.e. in the physical world.

User-System Interface—the method the user is required to use for creating profiles on, and interacting with, a system. In addition to working with other systems, the invention will include its own user-system interfaces, for users to manage and validate their identities on non-integrated systems.

Verified/Validated—these terms are used interchangeably. They mean that the invention considers the user's profile as accurately representing the individual, in the context of the system for which the profile was created. The invention determines the validity of a profile independent of the system, which allows the invention to maintain credibility and independence from the systems with which it communications.

Figure 1:
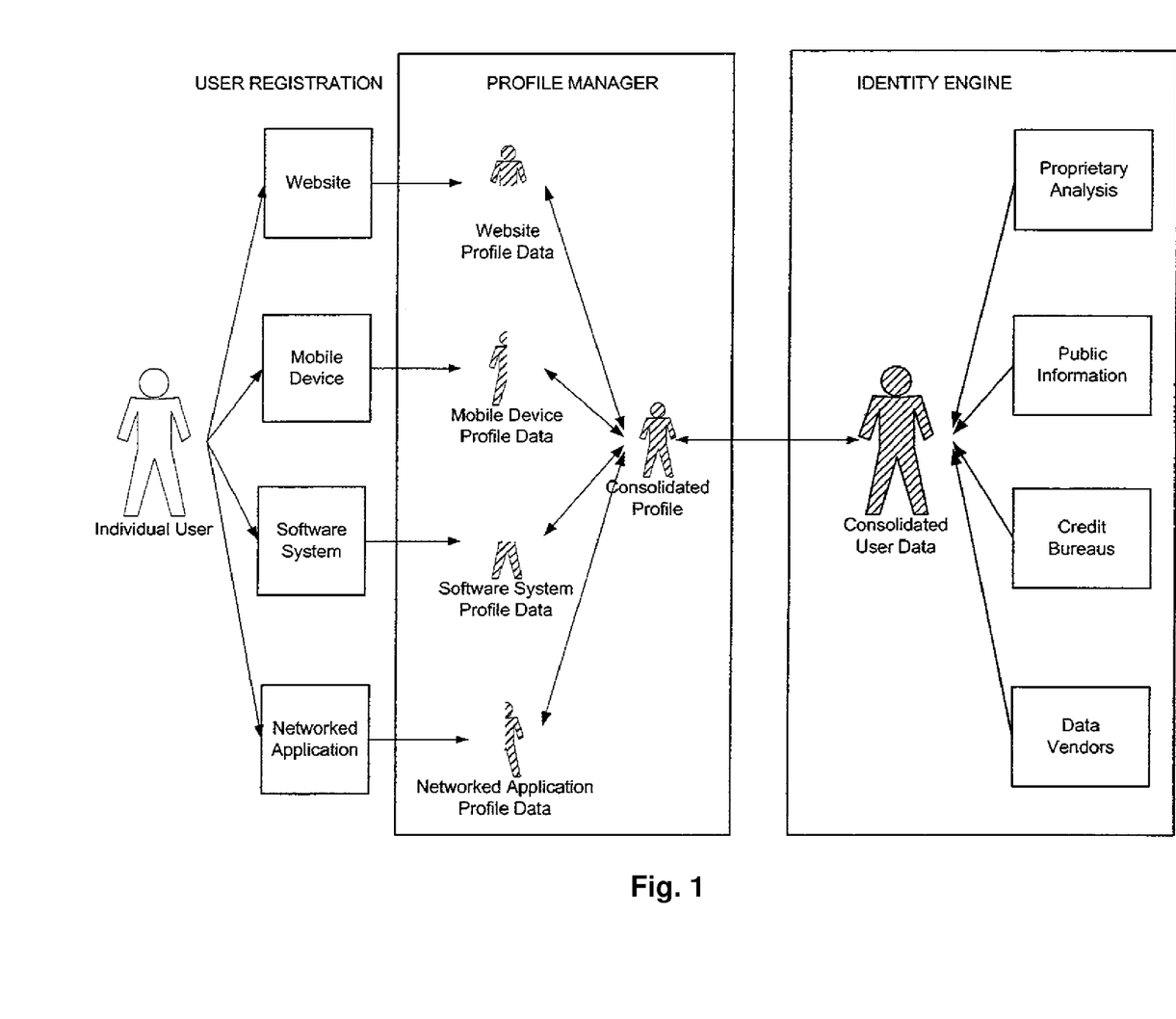
FIG. 1 is a schematic diagram of the Profile Manager and the Identity Engine of the invention.

FIG. 1 illustrates a user establishing profiles on a variety of systems that require registration: a website, a mobile device, a software system and a networked application. In each case, the user is asked to create some kind of unique identifier (login, password, etc.) and to provide some amount of private information as part of registration. The four different shaded icon fractions represent different sets of private information, since no profile requires all the information that comprises a user's identity.

Each of these systems is connected with the profile manager (part of the invention.) The profile manager tracks each unique profile on each system, and the specific private data elements associated with those profiles. The profile manager also creates a master profile that links all of the system profiles together (the whole shaded icon in the profile manager box.) Because a user can have multiple profiles set up on multiple systems, the consolidated profile serves as a one-to-many link between the actual user and his/her/its multiple profiles.

The profile manager communicates with the identity engine (part of the invention.) The identity engine creates detailed records of all the users who have profiles authenticated by the invention. The data it compiles is a product of credit bureau records, public records, data vendors and its own analysis. There is only one record for each user in the identity engine. The consolidated profile in the profile manager serves as the link between the master record in the identity engine and the multiple profiles stored in the profile manager.

Figure 2:
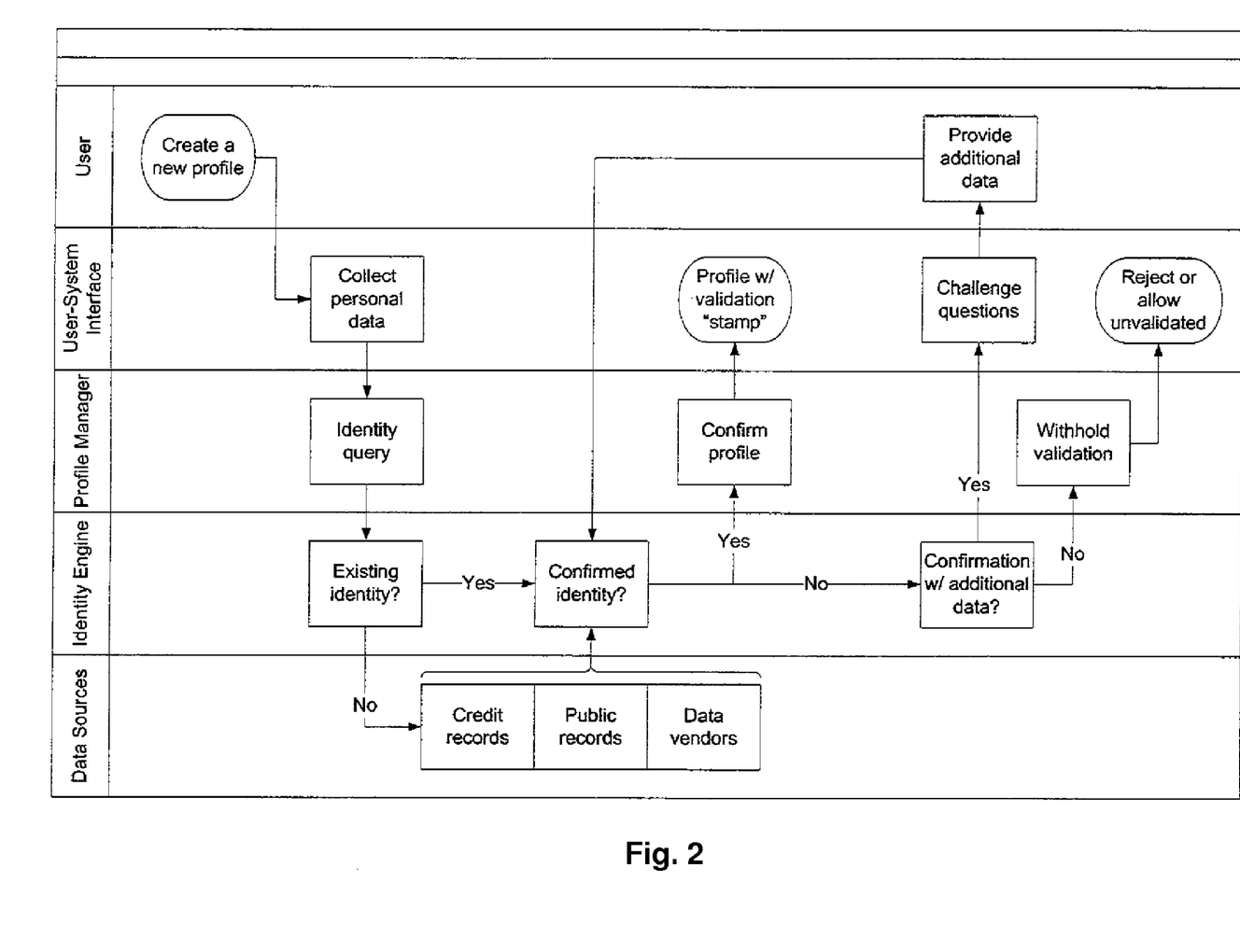
FIG. 2 is a schematic diagram of the creation of a validated profile according to the invention.

FIG. 2 demonstrates how a user creates a validated profile on a system. The user visits the user-system interface to create the profile. The user-system interface asks the user to input some unique private information, a subset of the total set of private information that comprises the user's virtual identity. In addition to whatever information the system requires for its own purposes from the user, the system-user interface must also request enough information for the invention to certify that the user is verified as authentic. The owners of the system and the owners of the invention will determine the criteria that satisfy authenticity.

The user-system interface then communicates the user information to the profile manager, which creates a new profile record, and then makes an identity query to the identity engine, using the profile data submitted by the system-user interface.

The identity engine determines whether or not it has a record for the user in question. The identity engine would have an existing record if the user had submitted for a verified profile through some other system, or through the same system using a different profile. If no pre-existing record exists, the identity engine will access various data sources to determine if the user is who he/she/it presents itself to be. If a pre-existing record does exist, the identity engine will determine whether or not, in this particular instance, the user has submitted sufficient/correct information to verify the new profile the user has just created. It is possible for a user to create a profile that is unverifiable, even if that user has previously created profiles that are verifiable.

If the identity engine verifies that the user, in this particular case, has submitted valid information, it sends confirmation to the profile manager. The profile manager in turn communicates that confirmation to the system user interface. That confirmation can be an icon, a symbol, text, a hyper-link, or a Boolean flag. Some systems may allow unverified users to have profiles. Systems may also allow degrees of verification, which the profile manager will be able to support. Other systems may require verification, and reject the profile creation out-right if the user is not verified. Regardless of what the system permits, the invention will maintain its standards of verification independent of the system.

If the identity engine cannot verify the user based on the profile information submitted, there are two options. The identity engine can request more user information, or it can reject the verification request.

If the identity engine determines that more user information may resolve the discrepancy, it will provide the user-system interface (either directly, or through the profile manager) a set of challenge questions or data requests for the user. Based on those answers, the identity engine will repeat the process of reconciling profile data against user identity data to determine if the profile can be verified. The invention will determine the number of times the "supplemental data request" cycle will be repeated.

If the identity engine rejects the verification request, the profile manager withholds profile validation. The system then has the option of permitting or refusing profile application, but the profile will not be verified, and there will be a clear distinction on that system between the unverified profile and other verified profiles.

Figure 3:
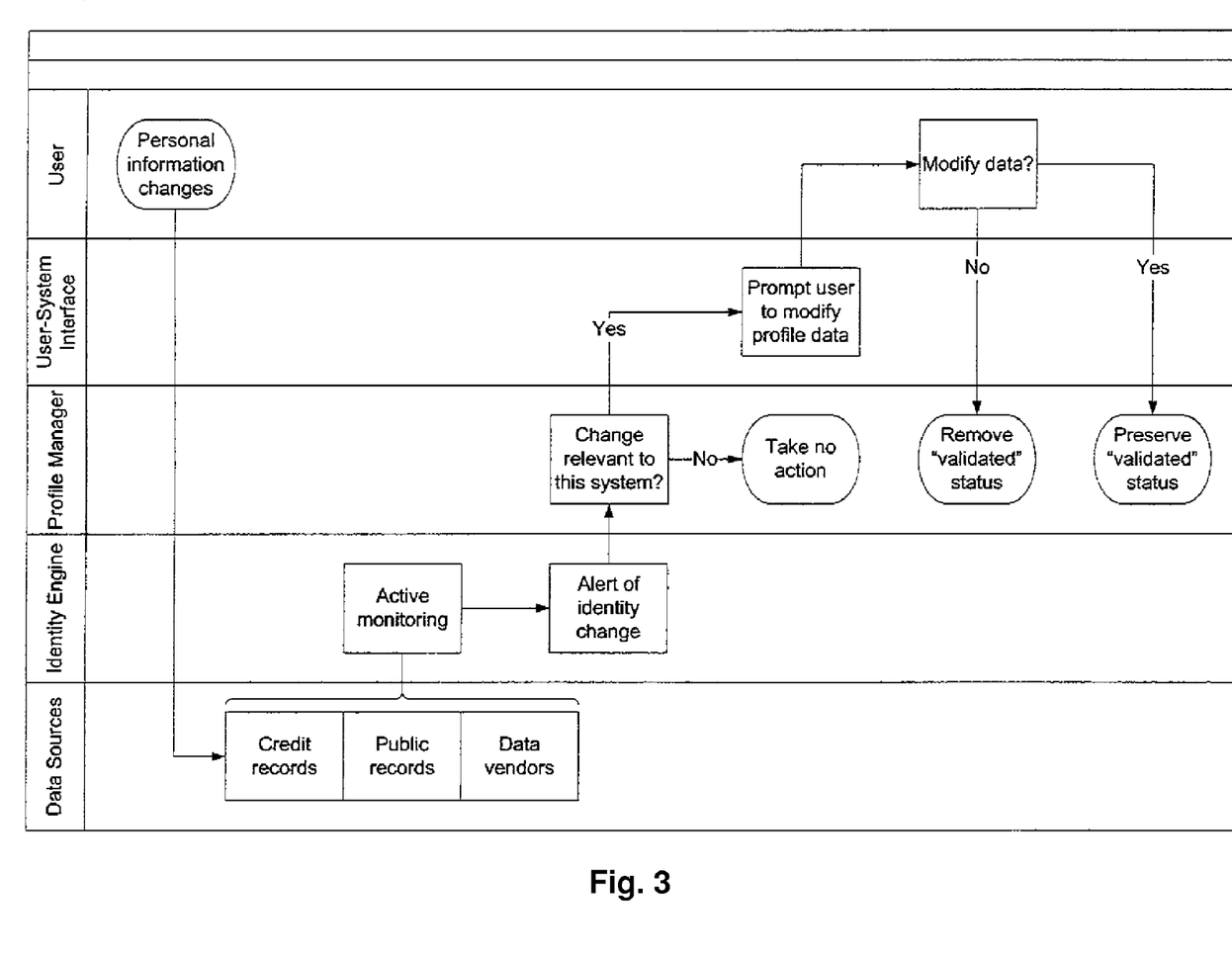
FIG. 3 is a schematic diagram of the monitoring and updating of profiles according to the invention.

FIG. 3 explains how the invention monitors a user's identity and updates the profile status on a particular system, when the changes to a user's identity data occur outside of the system. A user's identity data can change due to a wide range of factors. The user can change addresses, change names, take action which generates public records (criminal records, property ownership, marital status, etc.). It can also take action which affects records compiled by private entities (credit bureaus, profiling companies, insurance records, etc.).

The identity engine monitors these data sources for the user identity records it maintains. Some data sources offer services, such as credit monitoring, which automatically update subscribers of any record changes. For data sources where no such service is automated, regular polling and random inquiries will keep the identity engine up-to-date. In addition, the identity engine will have algorithms which prompt record inquiries (such as monitoring address/employment discrepancies, multiple marriage records, etc.).

When a user's identity data changes, the identity engine alerts the profile manager of the changes. The profile manager determines whether or not those changes impact any of the user's profiles. Some identity changes will have no affect on a user's or profiles. Change of marital status, for example, may have no impact on a profile created in an auction system. But that same change might affect the user's profile on a dating website. For all the profiles affected by the change, the profile manager has the relevant system alert the users. The users are prompted to update their profile information. If the users correctly update their profiles, the profile manager preserves the verified status. If the user incorrectly updates the system, or does not update the system, or the system elects not to notify the individual for changes, the profile manager removes the 'validated' status.

It is possible for the invention to validate a profile, and for the system that created the profile to invalidate it. In the above-mentioned example, the user's marital status changed. If that change was from 'single' to 'married' and the dating website did not allow married participants, the website could reject the user. In such a case the user's profile would be validated, in the sense that it was accurate, but be rejected by the system, which did not allow married individuals.

Note that FIG. 3 assumes the existence of an initially valid profile, as described in FIG. 2.

Figure 4:
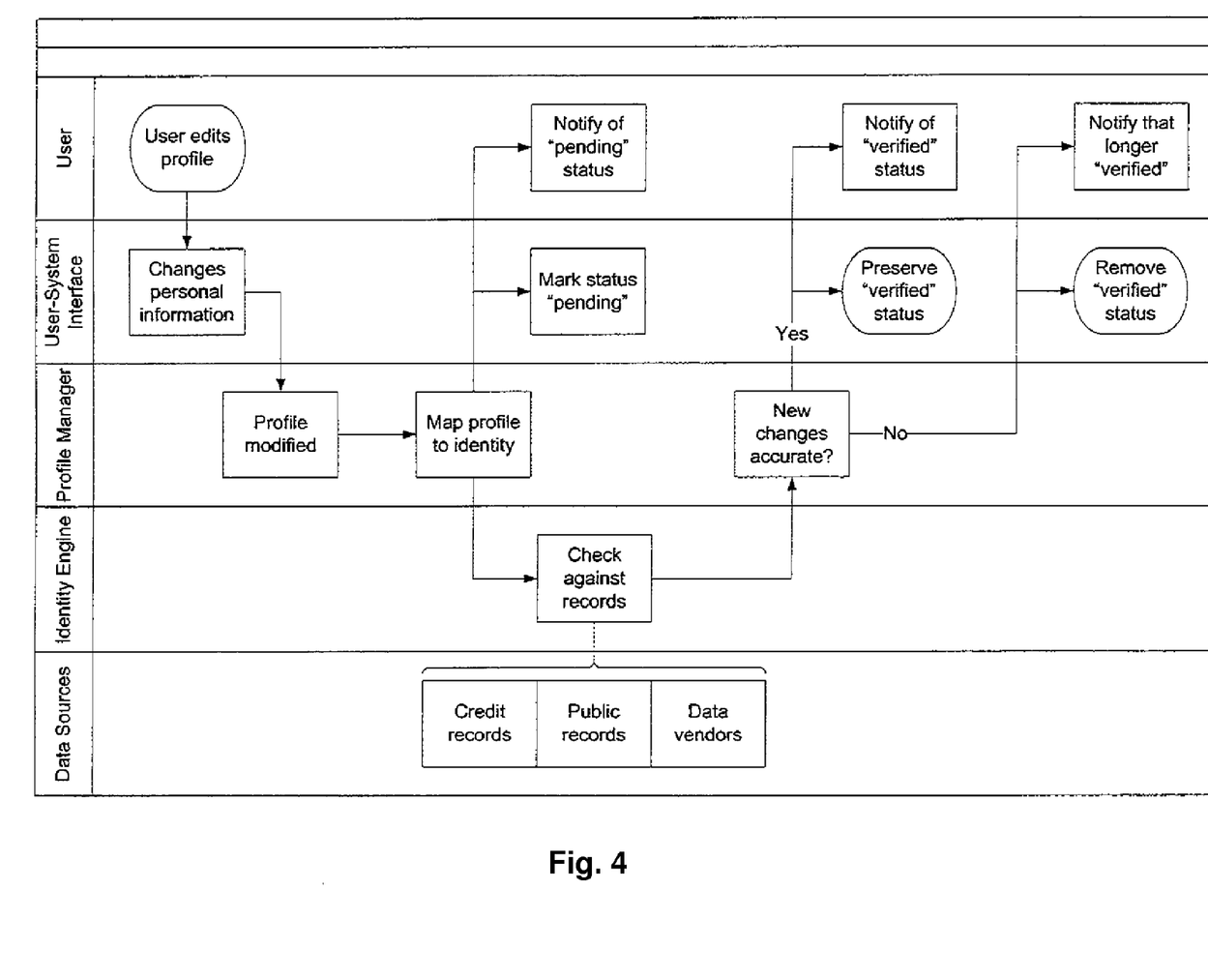
FIG. 4 is a schematic diagram of the monitoring of profile validation according to the invention.

FIG. 4 explains how the invention monitors profile validation when the user updates his/her/its profile within the system. When a user changes a profile, the user-system interface notifies the profile manager if that change affects profile validation. The profile manager takes three steps. It changes the user's profile validation status to "pending." It notifies the user that the profile in question is being reviewed for validation. And it maps that profile to the master profile it maintains, which links to the identity engine.

The identity engine checks its records and queries its data sources and determines whether or not the new information provided in the system matches with the user's identity data. If the new information matches the identity data, the profile manager restores the profile's "validated" status and notifies the user. If the new profile information does not match the identity data, the profile is no longer verified. The profile manager removes the verified status, and notifies the user.

There will, of course, be the possibility for appeal, and manual intervention. But the end result of that appeal or intervention process must result in a synchronizing of the information presented in the profile and the data stored in the identity engine.

Note: FIG. 4 assumes the existence of an initially valid profile, as described in FIG. 2.

Figure 5:
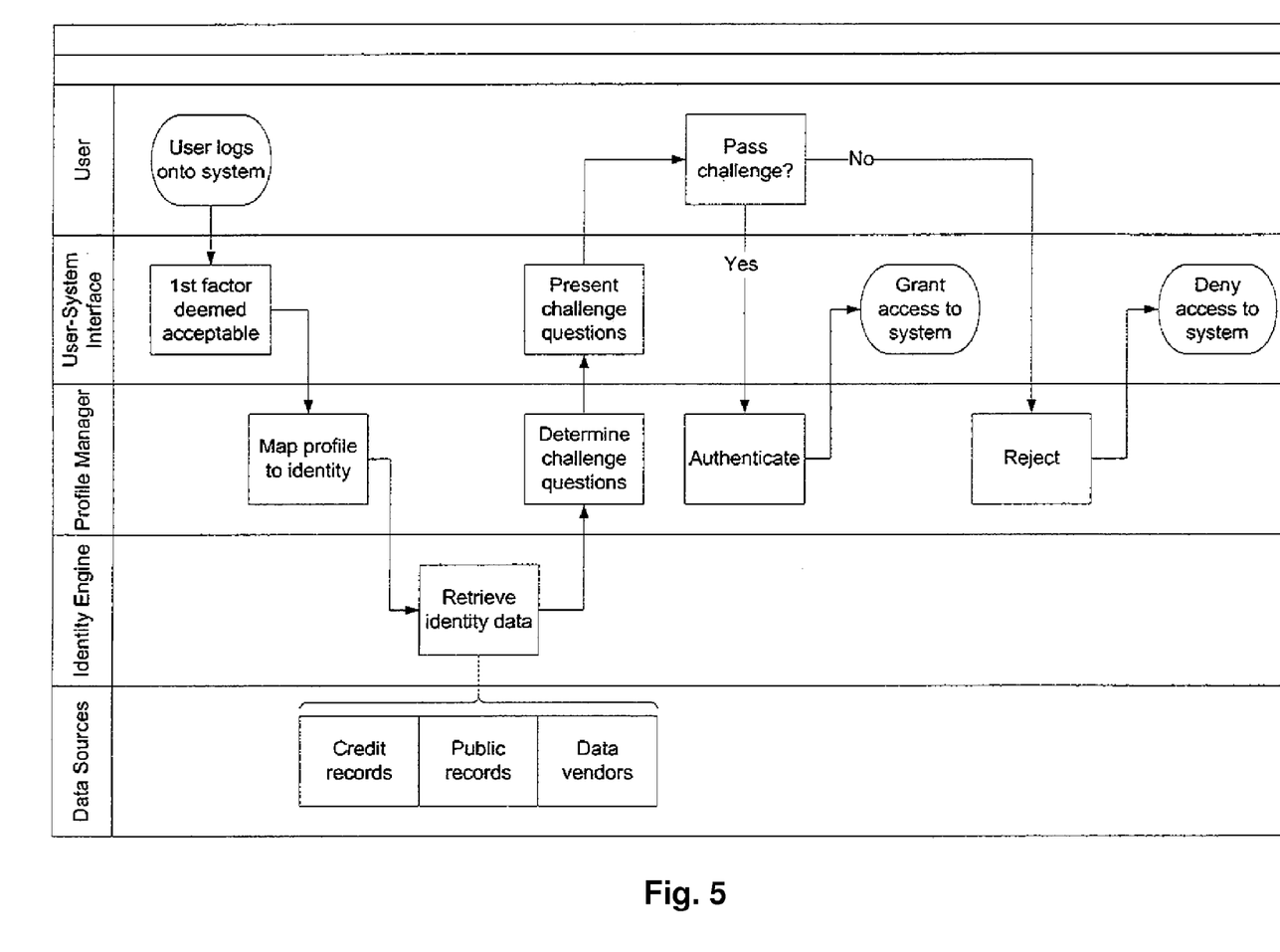
FIG. 5 is a schematic diagram of the use of the invention to provide two-factor authentication.

FIG. 5 illustrates how the invention is used to facilitate two-factor authentication. The invention will satisfy the "something you are" criteria with a verified user profile, since the validation of that profile depends on records and systems not under the user's control. In this case, the user logs on to the system using a verified. The profile manager maps that profile to its master profile, which in turn maps to the user's identity data.

The identity engine retrieves the user identity data, the scope of which exceeds any personal information stored by the system, in the profile or otherwise. Based on that information, the profile manager (through the user-system interface) offers challenge questions, the answers to which only a person with access to the entire user identity data profile would know. These questions are not limited, in scope, to the context of the system. For example, a person logging on to a corporate website could receive challenge questions about his student loans or his previous addresses.

If the user correctly answers enough of the challenge questions (the threshold being determined by the system and the owners of the invention) the profile manager authenticates that the user is "who" he/she/it is, and grants access to the system. If the user fails the challenge questions, the invention will not verify that the user "is" who the user is, and will fail the user's authentication process.

Note: FIG. 5 assumes the existence of an initially valid profile, as described in FIG. 2. It also assumes the ongoing monitoring of that profile, as described in FIGS. 3 and 4.

Figure 6:
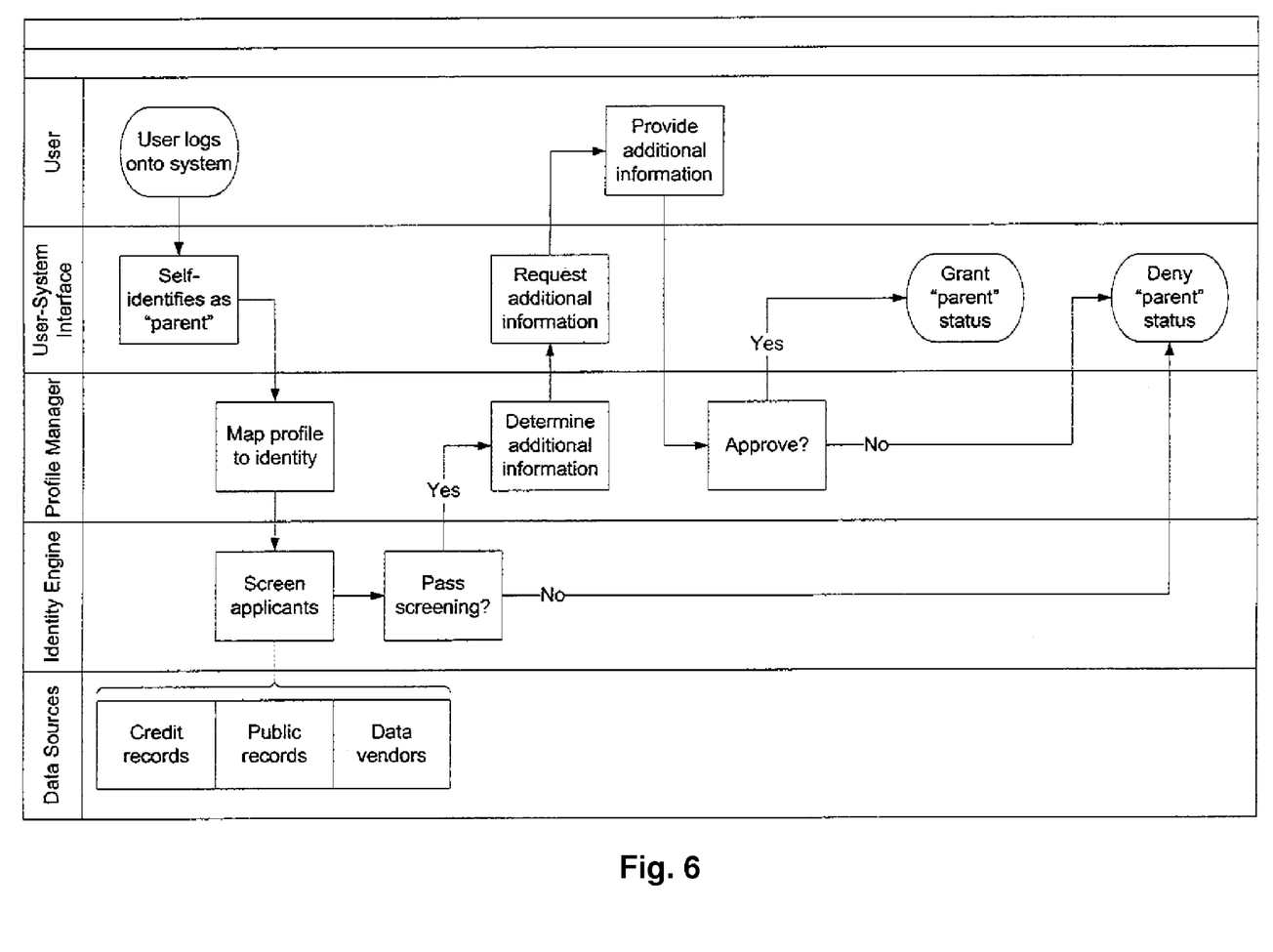
FIG. 6 is a schematic diagram of the verification of a user as a parent according to the invention.

FIG. 6 illustrates how the invention verifies a user as a parent. In general, the invention does not constrain users to be individuals, but in this use case, the user must be an individual. The user accesses the system, and either in the process of creating a profile, or post-profile creation, identifies him/herself as a parent. A user without a verified profile cannot be a parent, and if the user is creating a new profile, the verification process outlined in diagram #1 must be done prior, or in conjunction with, verifying as a parent.

Assuming that the user has a verified profile on the system, the profile manager maps that profile to the user's master profile, which in turn maps to the user's identity data.

The identity engine screens the parent for appropriateness. The exact criteria used to determine appropriateness is proprietary, but will include age screening, criminal record checks, sex offender checks, logged user complaints, and other data. If the identity engine determines that it cannot verify the individual as a parent, it will deny the user 'parent' status. This will not necessarily affect the profile's general 'verified' status.

If the user passes the screening, the profile manager will require the user to provide additional information that may or may not be contained in the user's system profile. That information will include, but is not limited to, physical address information, electronic contact information, email reply confirmation, etc. If the user provides the requested information, the invention will grant the user's profile 'parent' status. If not, that status will be withheld.

Note: FIG. 6 assumes the existence of an initially valid profile, as described in FIG. 2. It also assumes the ongoing monitoring of that profile, as described in FIGS. 3 and 4.

Figure 7:
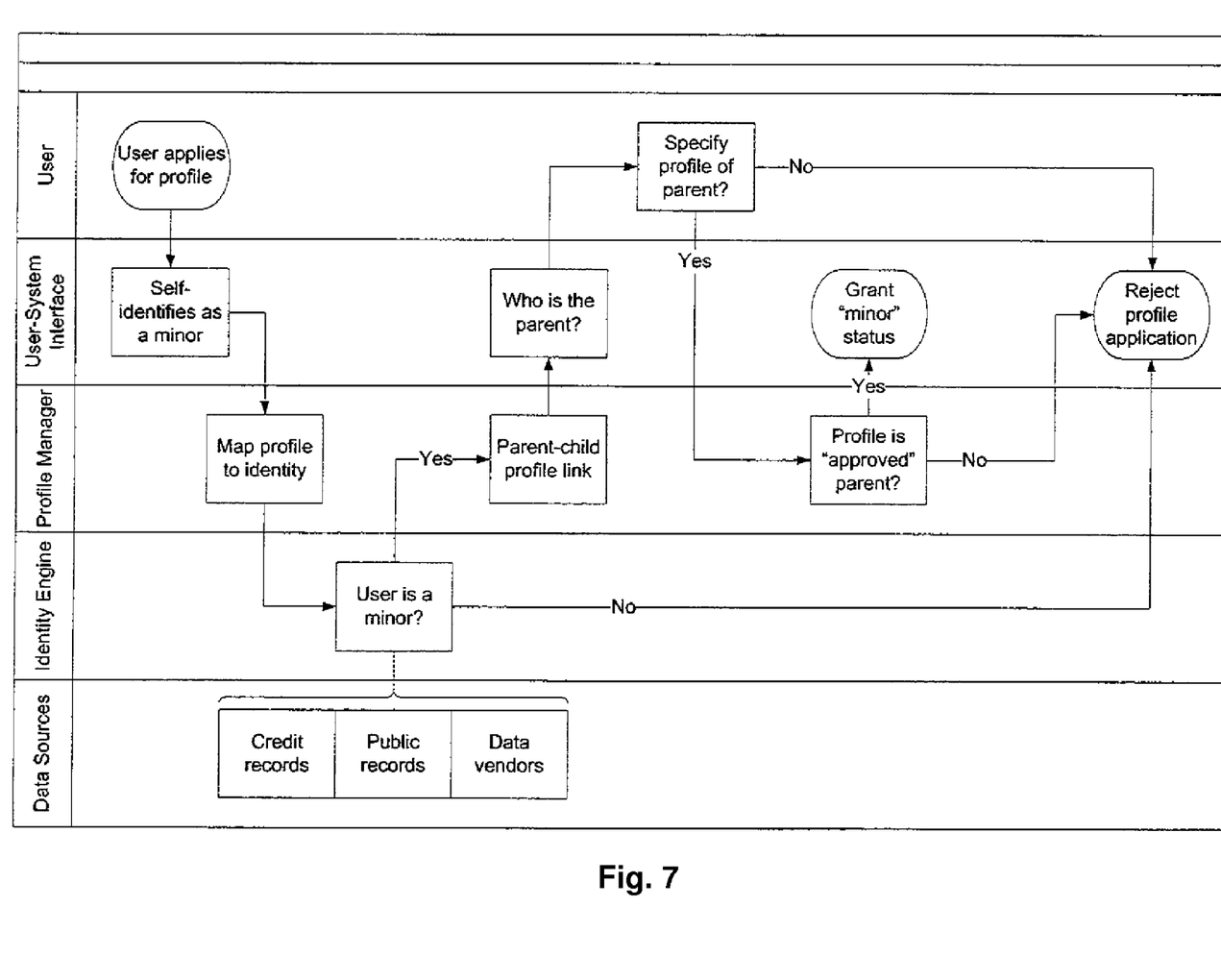
FIG. 7 is a schematic diagram of the verification of a user as a minor/child according to the invention.

FIG. 7 illustrates how the invention verifies a user as a child. A user must create a new child profile in the system-user interface. Existing verified profiles cannot be changed to 'child' profiles since, to pass the invention's validation process without a parent (i.e. without being a child) the user cannot be a minor.

The profile manager maps the child profile to a master profile (since a child user may have child profiles on other systems that allow parent-child verification by the invention.) The identity engine then confirms that the applicant is a minor by accessing the data sources that can confirm minor status.

If the applicant is a minor, the profile manager has the system-user interface procure the profile of the parent. If the user fails to provide a parent with a verified profile, the application for 'child' status is rejected. If the user provides a parent verified profile, the profile manager screens the approved profile to determine if the submitted parent is, in fact, the parent of the child. This screening process will include, but is not limited to, address checking, call-back confirmations, email confirmation, etc. The screening process may involve requesting additional information, listing of references, or any other steps the invention requires vouching for the parent-child relationship. This screening step is necessary because it is possible for an adult to pass the parent screening process, and for a minor to pass the child screening test, and for that parent not to be the actual parent of the minor in question. The parents of a child's best friend (who is also a minor) cannot, for example, be listed as parents of the applicant child, even if those parents have children who are already on the system.

Note: FIG. 7 assumes the existence of a parent profile, as described in FIG. 6. FIG. 7 also assumes the ongoing monitoring of itself, as described in FIGS. 3 and 4, as well as the ongoing monitoring of the parent profile.

Figure 8:
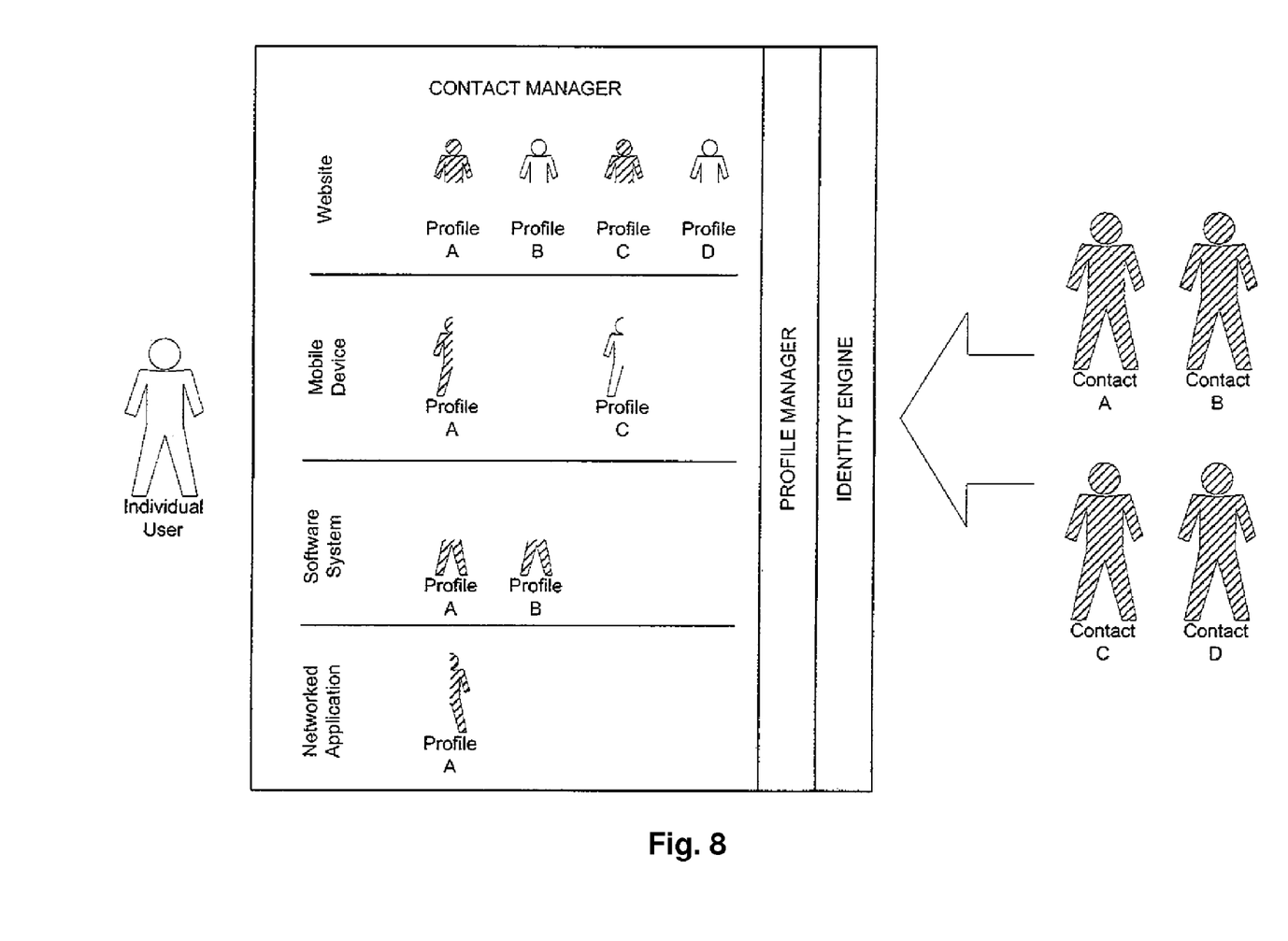
FIG. 8 is a schematic diagram of the Contact Manager of the invention.

FIG. 8 illustrates how the contact manager (part of the invention) allows a verified user to verify his/her/its contacts on all systems for which the user has profiles. The invention will, in effect, extend the verification benefits that systems enjoy to individual users of those systems.

The user in this case has profiles on several systems. These profiles have been verified by the invention. The invention can also manage contacts for systems where the user does not have a verified profile, but the user may not have full access to the invention's functionality in that case. For each system in question, the invention will display all the user's contacts, and indicate whether or not those profiles have been verified by the invention. The user can regulate visibility, information access, contact permissions, and a range of other controls, based on the validity of the user's contacts.

The invention may be used to explore and establish new contacts, communicate with contacts, and in general extend the communication functionality of the systems for which the profiles exist.

The invention also offers notification services, automatic screening, warning and blocking based on the changing validity of the user's contacts.

Note: FIG. 8 assumes the existence of an initially valid profile, as described in FIG. 2. It also assumes the ongoing monitoring of that profile, as described in FIGS. 3 and 4. It further assumes that any contact represented as verified has been subject to the same creation and ongoing monitoring criteria.

In one embodiment, the present invention utilizes personal computer-based client/server architecture comprising one or more processors (such as a microprocessor or central processing unit (CPU)). As Web interface technology matures, other embodiments of the present invention, using very similar if not identical architecture, might well be implemented over the Internet or other successor or predecessor wide-area networks. Under such embodiments, the "server" might be any set of computers on the Internet that look like a single data source to the client. The "client" might be any computer, portable digital assistant, cellular telephone, and like devices on the Internet running one of several commercially available browsers. Any programming language(s) and database systems can be employed, including Visual Basic, C++, Java, SQL, and the like.

Note that in the specification and claims, "about" or "approximately" means within twenty percent (20%) of the numerical amount cited.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A user identity verification method comprising the steps of:
   collecting in a computer database consolidated user data comprising information about a method user from a plurality of sources selected from the group consisting of credit bureau information, information from data vendors, and public information;
   generating a plurality of profiles of the method user comprising a plurality of subsets of consolidated data of the method user corresponding to a plurality of access levels;
   receiving an unknown user's validation request;
   assigning an access level to the validation request;
   requesting information from the unknown user;
   matching returned information from the unknown user to that in the subset of the consolidated data of the method user corresponding to the assigned access level; and
   verifying that the unknown user is the method user by issuing an icon indicative of verification, the icon issued in a format for use on non-licensed third-party websites; and
   wherein the method steps are performed by one or more processors.

2. The method of claim 1 wherein the requested information comprises information from a credit bureau.

3. The method of claim 1 additionally comprising the step of altering the profile of the method user as information from the plurality of sources changes over time.

4. The method of claim 3 additionally comprising the step of prompting the method user to enter matching changed information in order to maintain a validated status.

5. The method of claim 1 additionally comprising the step of allowing the method user to alter the profile.

6. The method of claim 5 additionally comprising the step of verifying with the plurality of sources that the alteration to the profile is accurate.

7. The method of claim 1 wherein the method is used by an unknown user seeking authorization by a third party via a two-factor authentication process.

8. The method of claim 1 additionally comprising the step of marking a profile as that of a parent or a child depending on presence or absence of credit bureau information.

9. The method of claim 8 additionally comprising the step of linking profiles of parents and children such that parents have control over the profiles of the children.

10. The method of claim 1 additionally comprising the step of establishing a contact manager for the method user containing information on other users and an indication of whether such other users have been verified by the method.

11. The method of claim 1 wherein said identity verification method is performed over and over in a repeated fashion.

12. A user identity verification apparatus comprising:
   a computer database of consolidated user data comprising information about an apparatus user from a plurality of sources selected from the group consisting of credit bureau information, information from data vendors, and public information; and
   one or more processors generating a plurality of profiles of the apparatus user comprising a plurality of subsets of the consolidated data of the apparatus user corresponding to a plurality of access levels, receiving an unknown user's validation request, assigning an access level to the validation request, requesting information from the unknown user, matching returned information from the unknown user to that in the subset of the consolidated data of the apparatus user corresponding to the assigned access level, and verifying that the unknown user is the apparatus user by issuing an icon indicative of verification, said icon issued in a format for use on non-licensed third-party websites.

13. The apparatus of claim 12 wherein the requested information comprises information from a credit bureau.

14. The apparatus of claim 12 wherein said one or more processors additionally alter the profile of the apparatus user as information from the plurality of sources changes over time.

15. The apparatus of claim 14 wherein said one or more processors additionally prompt the apparatus user to enter matching changed information in order to maintain a validated status.

16. The apparatus of claim 12 wherein said one or more processors additionally allow the apparatus user to alter the profile.

17. The apparatus of claim 16 wherein said one or more processors additionally verify with the plurality of sources that the alteration to the profile is accurate.

18. The apparatus of claim 12 wherein said apparatus is used by an unknown user seeking authorization by a third party via a two-factor authentication process.

19. The apparatus of claim 12 wherein said one or more processors additionally mark a profile as that of a parent or a child depending on presence or absence of credit bureau information.

20. The apparatus of claim 19 wherein said one or more processors additionally link profiles of parents and children such that parents have control over the profiles of the children.

21. The apparatus of claim 12 wherein said one or more processors additionally establish a contact manager for the apparatus user containing information on other users and an indication of whether such other users have been verified by the apparatus.

22. The apparatus of claim 12 wherein requesting information from the unknown user and matching returned information from the unknown user is performed over and over in a repeated fashion.

23. A user identity verification method comprising the steps of:
   a user submitting personal information of the user to a database;
   verifying as accurate with a source other than the user at least some of the personal information submitted by the user;
   issuing to a user, iconic indicia in a format for use on non-licensed third-party websites, the iconic indicia relating to at least one aspect of the information submitted by the user;
   at least periodically verifying with a source other than the user that at least some of the personal information submitted by the user is accurate; and
   revoking the user's iconic indicia if the data previously verified as accurate and for which the iconic indicia was issued fails a subsequent verification attempt.

24. The method of claim 23 further comprising optionally verifying multiple aspects of the user's personal information.

25. The method of claim 24 wherein said multiple aspects comprise an element selected from a list consisting of an employment aspect and a dating aspect.

* * * * *